US007434102B2

United States Patent
Rothman et al.

(10) Patent No.: US 7,434,102 B2
(45) Date of Patent: Oct. 7, 2008

(54) HIGH DENSITY COMPUTE CENTER RESILIENT BOOTING

(75) Inventors: Michael A. Rothman, Puyallup, WA (US); Robert C. Swanson, Olympia, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 671 days.

(21) Appl. No.: 11/026,407

(22) Filed: Dec. 29, 2004

(65) Prior Publication Data

US 2006/0143602 A1 Jun. 29, 2006

(51) Int. Cl.
G06F 11/00 (2006.01)
(52) U.S. Cl. ........................................................ 714/36
(58) Field of Classification Search .................... 714/36, 714/10–13, 15, 16, 18, 38
See application file for complete search history.

(56) References Cited

U.S. PATENT DOCUMENTS

| | | | | |
|---|---|---|---|---|
| 5,594,893 A | * | 1/1997 | Byers et al. | 713/502 |
| 6,425,093 B1 | * | 7/2002 | Singh et al. | 714/38 |
| 6,622,261 B1 | * | 9/2003 | Laranjeira et al. | 714/11 |
| 6,654,910 B1 | * | 11/2003 | Eibach et al. | 714/37 |
| 7,260,738 B2 | * | 8/2007 | Cohen et al. | 714/6 |
| 2003/0229775 A1 | * | 12/2003 | Schelling | 713/1 |
| 2005/0066218 A1 | * | 3/2005 | Stachura et al. | 714/3 |

OTHER PUBLICATIONS

"Intelligent Platform Management Interface Specification, v 1.5," Feb. 20, 2002, pp. i-xxii, 1-40, © Intel Corporation, Hewlett-Packard Company, NEC Corporation, Dell Computer Corporation.

* cited by examiner

*Primary Examiner*—Nadeem Iqbal
(74) *Attorney, Agent, or Firm*—Blakely, Sokoloff, Taylor & Zafman LLP

(57) ABSTRACT

A system and method to implement a resilient compute center. A plurality of processing systems is initialized. Each of the processing systems capable of operation communicates status information about its operational health to a management module responsible for managing the processing systems. The management module reinitializing any of the processing systems, if the management module determines that any of the processing systems is operating in a degraded state based on the status information communicated to the management module.

20 Claims, 6 Drawing Sheets

HIGH DENSITY COMPUTE CENTER RESILIENT BOOTING

TECHNICAL FIELD

This disclosure relates generally to resilient high density computing, and in particular but not exclusively, relates to resilient booting of blade centers.

BACKGROUND INFORMATION

Blade center architecture is an evolving technology that conveniently packages a processing system on a single board called a processing blade and houses a plurality of similar processing blades in a chassis. The processing blades can be easily installed or removed as desired and share common resources, such as input/output ("I/O") ports, I/O media, one or more network connections, and the like. The ease with which the processing power of the blade center can be scaled by adding or removing processing blades is a key feature driving the development and use of blade center technology. This scalable feature makes blade centers ideal candidates for performing tasks such as data and webpage hosting.

Processing blades typically are complete processing systems including a processor, firmware, system memory, one or more hard disks, a network interface card ("NIC"), and the like. Current processing blades are left to themselves to power on, self-diagnose, and reset via a policy called Fault Resilient Booting ("FRB"), if the boot process fails. However, in some scenarios the individual processing blade may be incapable of self-reset or recovery. Some blade centers include a management module to coordinate and manage the operation of the individual processing blades. However, these blade centers are particularly vulnerable to a failure of the management module, which may result in the entire blade center ceasing to function.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method for providing resilient booting and surrogate management of a high density compute center are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
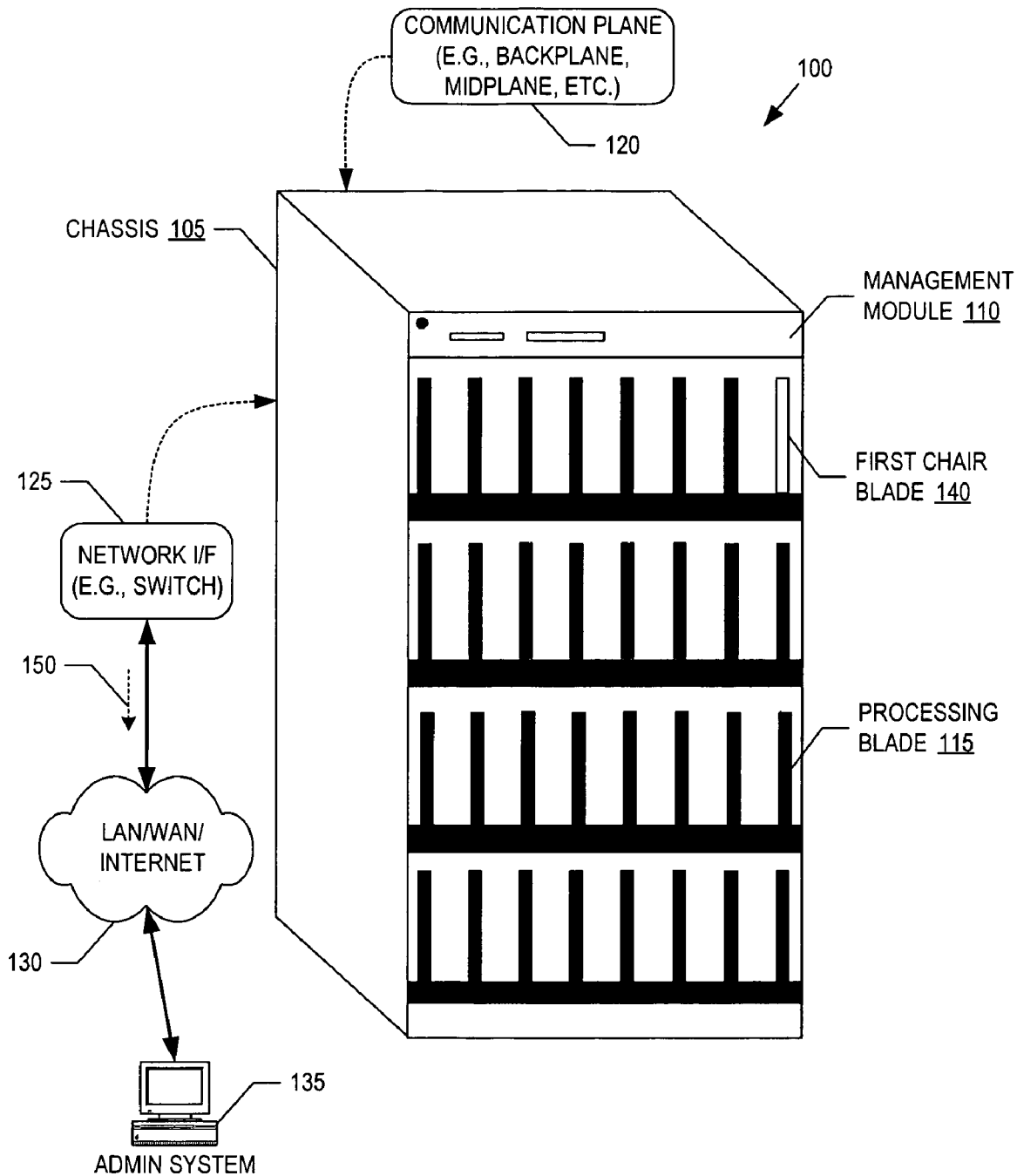
FIG. 1 illustrates a compute center including a management module and processing blades wherein one or more of the processing blades are capable of assuming a surrogate management module role, in accordance with an embodiment of the invention.

FIG. 1 illustrates a compute center 100 including a management module and processing blades wherein one or more of the processing blades are capable of assuming a surrogate management module role and transmitting status information to a management module, in accordance with an embodiment of the invention. Compute center 100 is illustrated as a blade center; however, embodiments of the invention are equally applicable to other high density compute centers.

The illustrated embodiment of compute center 100 includes a chassis 105, a management module 110, processing blades 115, a communication plane 120, and a network interface 125. Chassis 105 supports processing blades 115 vertically in rows (as illustrated), horizontally in columns, or other advantageous configurations. The management module 110 may be mounted in an orientation distinct from processing blades 115 (e.g., at the top of chassis 105 as illustrated) or management module 110 may have a similar form factor and mount orientation as processing blades 115.

Management module 110 is an independent hardware module with specialized software/firmware to perform management functions, such as, monitoring processing blades 115, coordinating arbitration and allocation of shared resources between processing blades 115, logging system errors, coordinating fault resilient booting ("FRB") of processing blades 115, load balancing work requests between processing blades 115, controlling network access, fan control, power supply monitoring and regulation, and the like. In one embodiment, management module is referred to as a unified management module ("UMM"). From a hardware perspective, a UMM may be similar or identical to processing blades 115 with specialized software and/or firmware for conducting management functions. In yet another embodiment, management module 110 may be a chassis management module ("CMM") mounted to chassis 105. A CMM performs similar functions to a UMM. In one embodiment, management module 110 includes unique hardware interconnects for monitoring and managing each of processing blades 115. Management module 110 may further provide shared resources to processing blades 115, such as I/O ports (e.g., serial port, parallel port, universal serial bus port), I/O devices (e.g., monitor, keyboard, mouse, CD-ROM drive, floppy drive), and the like.

In one embodiment, compute center 100 is capable of implementing robust FRB techniques, described below. Processing blades 115 self-interrogate to determine status information about both their designed-for operational capabilities and any current hardware/software failures (e.g., failed memory banks, failed processors, faulty option ROMs, etc.). In embodiment, this status information is accumulated by each of processing blades 115 and reported to management module 110. Based at least in part on the status information, if management module 110 determines that any of processing blades 115 has failed to boot in a fully operational state, then management module 110 will take appropriate action, such as, resetting the faulty processing blade 115 and/or alerting an administrator system.

In one embodiment, one or more of processing blades 115 is capable of acting as a surrogate management module to temporarily assume management duties in the event management module 110 ceases to operate. During an initialization of each processing blade 115, one of processing blades 115 may claim a "first chair" status (e.g., first chair blade 140). First chair blade 140 is the one of processing blades 115 designated as the first inline surrogate management module, should management module 110 fail.

Management module 110 and processing blades 115 are interconnected via communication plane 120. Communication plane 120 may include a backplane, a mid-plane, serial or parallel buses, and the like for providing intercommunication between processing blades 115 and between processing blades 115 and management module 110. This intercommunication may be out-of-band of communications external to computer center 100 over a network 130. Network interface 125 provides processing blades 115 and management module 110 with switchable access to network 130 (e.g., local area network, wide area network, Internet, etc.). An administrator system 135 may couple to network 130 to enable an Information Technology ("IT") technician to supervise the operation of compute center 100. Should one of processing blades 115 repeatedly fail, then management module 110 may transmit an alert signal 150 to administrator system 135 notifying the IT technician of the faulty processing blade. Should management module 110 fail, then first chair blade 140 may transmit alert signal 150 to administrator system 135 notifying the IT technician of the faulty management module.

Figure 2:
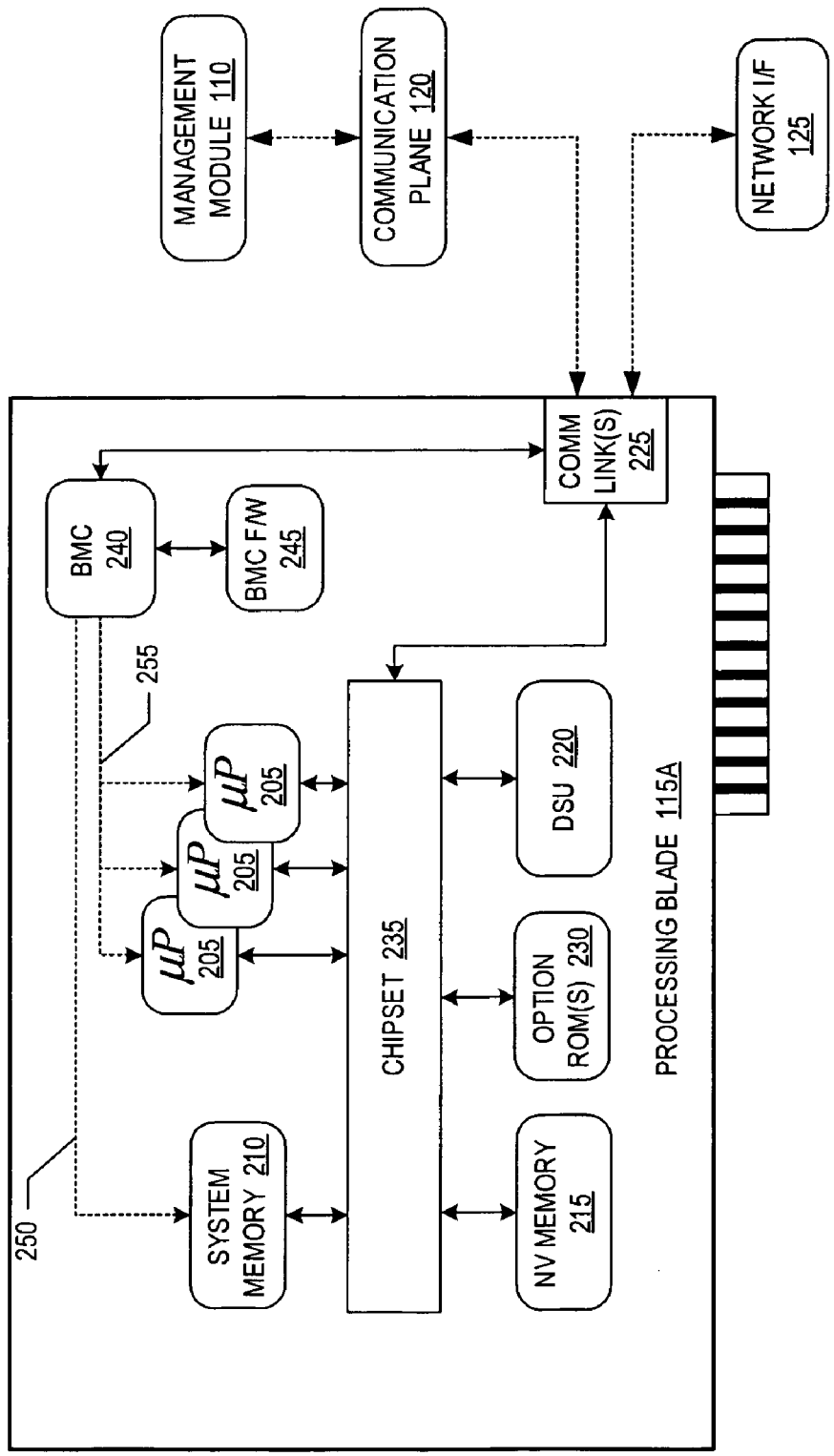
FIG. 2 is a block diagram illustrating a processing blade capable of transmitting operational status information to a management module and assuming a surrogate management module role, in accordance with an embodiment of the invention.

FIG. 2 is a block diagram illustrating a processing blade 115A, in accordance with an embodiment of the invention. Processing blade 115A represents an embodiment of one of processing blades 115. Processing blade 115A is a complete processing system including one or more processors 205, system memory 210, nonvolatile ("NV") memory 215 for storing firmware, a data storage unit ("DSU") 220 for storing software, one or more communication links 225 for coupling to communication plane 120 and network interface 125, option read only memories ("ROMs") 230, and a chipset 235. As illustrated, processing blade 115A may optionally include a baseboard management controller ("BMC") 240 and associated BMC firmware unit 245.

BMC 240 may include a service processor, which coordinates with management module 110 to perform the management functions described above. Communication between BMC 240 and management module 110 occurs across communication plane 120 where communication may be out-of-band of communications through network interface 125. Similarly, processing blade 115A can gain access to the shared resources of compute center 100 via communication plane 120.

Processing blade 115A may implement an error module to interrogate itself and report status information about its operational health to management module 110. This error module may be implemented entirely in hardware by BMC 240 or other hardware entity, entirely in software saved to any of DSU 220, NV memory 215, or BMC firmware unit 245, or a combination thereof. In one embodiment, the error module is a firmware entity stored to BMC firmware unit 245 and executed by BMC 240.

Processing blade 115A may further implement a surrogate management module capable of assuming the management duties performed by management module 110. As with the error module, the surrogate management module may be implemented entirely in hardware by BMC 240 or other hardware entity, entirely in software saved to any of DSU 220, NV memory 215, or BMC firmware unit 245, or a combination thereof. In one embodiment, the surrogate management module is a firmware entity stored to BMC firmware unit 245 and executed by BMC 240.

The elements of processing blade 115A are interconnected as follows. Processor(s) 205 are communicatively coupled to system memory 210, NV memory 215, DSU 220, and communication link(s) 225, via chipset 235 to send and to receive instructions or data thereto/therefrom. In one embodiment, NV memory 215 is a flash memory device. In other embodiments, NV memory 215 includes any one of read only memory ("ROM"), programmable ROM, erasable programmable ROM, electrically erasable programmable ROM, or the like. In one embodiment, system memory 210 includes random access memory ("RAM"), such as dynamic RAM ("DRAM"), synchronous DRAM, ("SDRAM"), double data rate SDRAM ("DDR SDRAM") static RAM ("SRAM"), and the like. DSU 220 represents any storage device for software data, applications, and/or operating systems, but will most typically be a nonvolatile storage device. DSU 220 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. It should be appreciated that various other elements of processing blade 115A have been excluded from FIG. 2 and this discussion for the purposes of clarity. Chipset 235 may also include a system bus and various other data buses for interconnecting subcomponents, such as a memory controller hub and an input/output ("I/O") controller hub, as well as, include data buses (e.g., peripheral component interconnect bus) for connecting peripheral devices to chipset 235. Correspondingly, processing blade 115A may operate without one or more of the elements illustrated. In one embodiment, the functionality provided by BMC 240 may be integrated into chipset 235.

In one embodiment, processing blade 115A may further include sensor lines 250 and 255 coupling BMC 240 to system memory 210 and processors 205, respectively. Sensor lines 250 and 255 provide a hardware based solution for determining whether system memory 210 and processors 205 are fully operational, operating in a degraded state, or not operating at all.

The processes explained below are described in terms of computer software and hardware. The techniques described may constitute machine-executable instructions embodied within a machine (e.g., computer) readable medium, that when executed by a machine will cause the machine to perform the operations described. Additionally, the processes may be embodied within hardware, such as an application specific integrated circuit ("ASIC") or the like. The order in which some or all of the process blocks appear in each process should not be deemed limiting. Rather, one of ordinary skill in the art having the benefit of the present disclosure will understand that some of the process blocks may be executed in a variety of orders not illustrated.

Figure 3A:
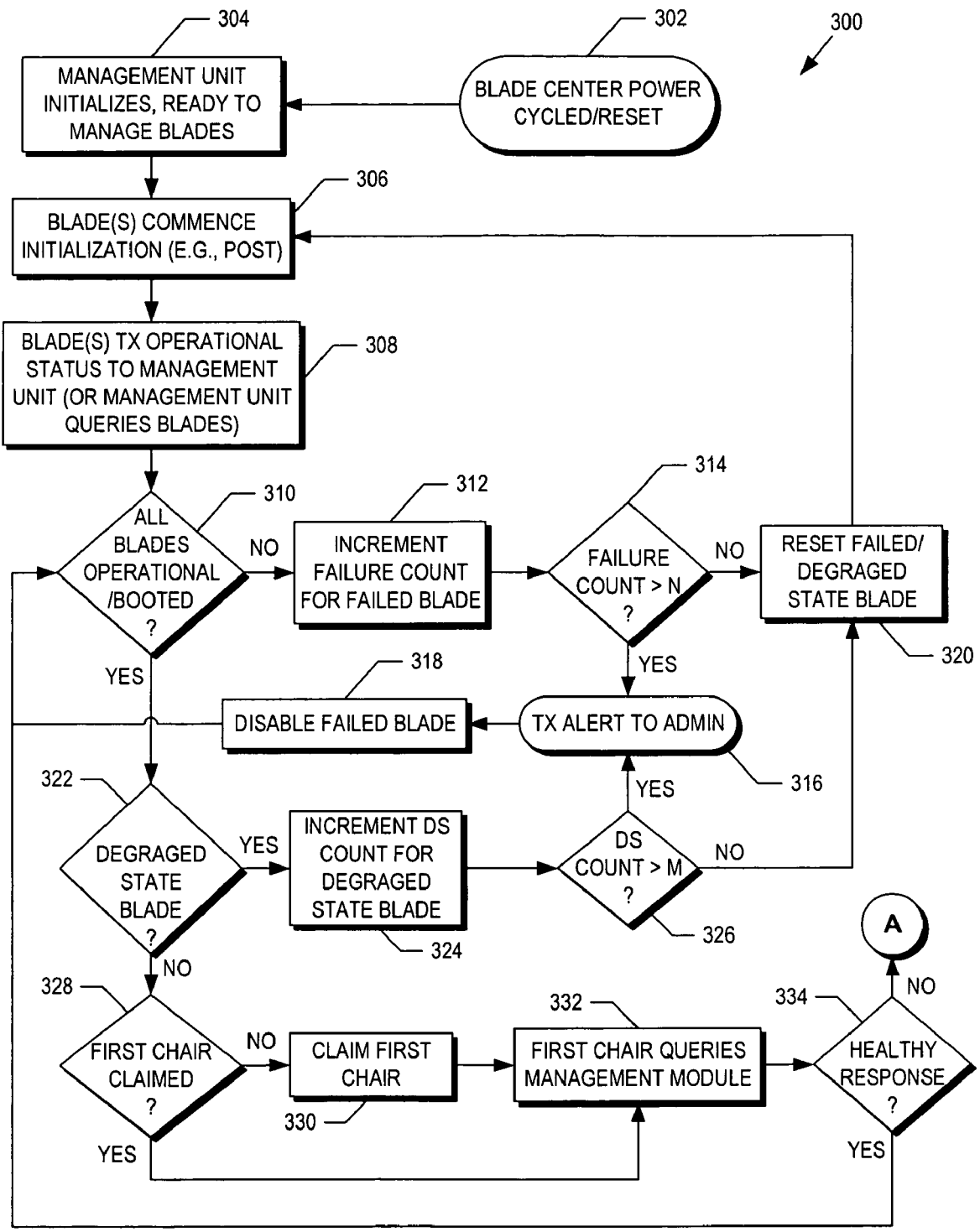
FIG. 3A is a flow chart illustrating a process for resetting failed or degraded state processing blades and claiming a first chair status to assume a surrogate management module role, in accordance with an embodiment of the invention.

FIG. 3A is a flow chart illustrating a process 300 for resetting failed or degraded state processing blades 115 and claiming a first chair status by one of processing blades 115 to assume a surrogate management module role, in accordance with an embodiment of the invention. In a process block 302, blade center 100 is power cycled or otherwise reset. In a process block 304, management module 110 initializes (e.g., boots up) to ready itself for managing processing blades 115. Once management module 110 is up and running, processing blades 115 commence their own initializations (process block 306).

Initialization of each processing blade 115 may include execution of a pre-boot (i.e., pre operating system runtime) self-diagnosis procedure such as Power On Self Test ("POST") or the like. During this pre-boot self-diagnosis procedure, a pre-boot error module may interrogate the various components of processing blade 115A to determine the actual operational capabilities of processing blade 115A and to determine the fully operational capabilities of processing blade 115A. Alternatively, processing blade 115A may store predefined metrics detailing its fully operational capabilities, which may be used as a benchmark against which the actual operational capabilities are compared.

Figure 4:
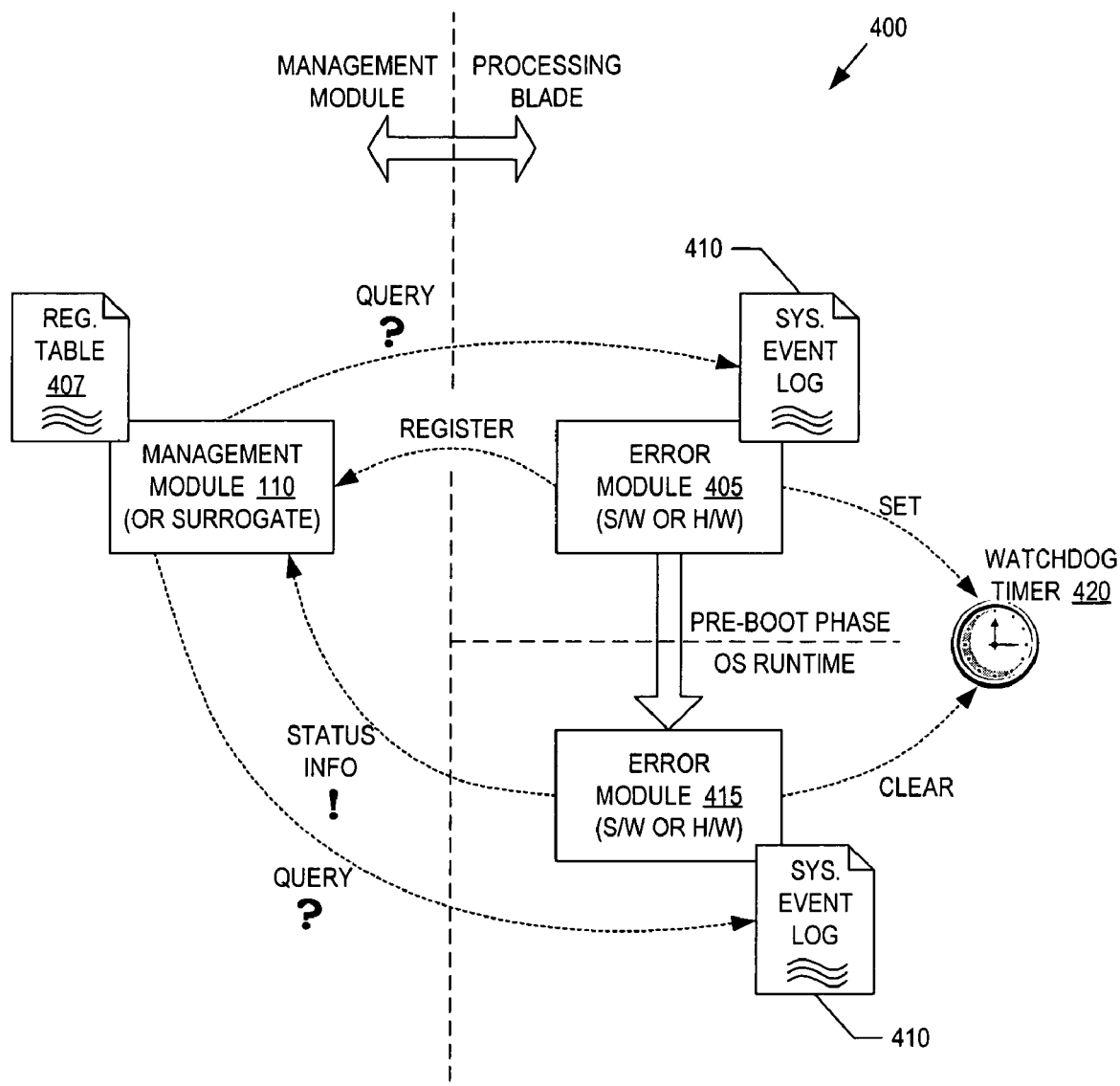
FIG. 4 is a block diagram illustrating a system for communicating status information from a processing blade to a management module, in accordance with an embodiment of the invention.

FIG. 4 is a block diagram illustrating a system 400 for communicating status information from processing blade 115A to management module 110, in accordance with an embodiment of the invention. In the illustrated embodiment, during the pre-boot phase of initializing processing blade 115A, an error module 405 registers with management module 110. Registering with management module 110 may include conveying the fully operational capabilities information to management module 110. The fully operational capabilities information provides management module 110 with knowledge of the full operational capabilities of processing blade 115A when operating in a non-degraded state (e.g., fully operational state). This fully operational capabilities information may be saved to a registration table 407 by management module 110. Registration table 407 may be updated each time one of processing blades 115 reboots. Alternatively, registration table 407 may be updated the first time each of processing blades 115 is added to compute center 100 and booted, and only subsequently, when a particular processing blade 115 is updated with hardware modification or software installations.

Error module 405 may be a software component, hardware component, or a combination thereof, within processing blade 115A. For example, error module 405 may represent a firmware agent stored within BMC firmware unit 245 and executed by BMC 240, BMC 240 itself, a firmware agent stored within NV memory 215, a hardware entity within chipset 235, or the like.

During the initialization of processing blade 115A, error module 405 may generate a system event log 410 to accumulate status information itemizing progress of the initialization of processing blade 115A and the actual operation capabilities of processing blade 115A. System event log 410 may include notifications of successful, degraded, or failed initializations of various hardware and software components of processing blade 115A (e.g., processors 205, system memory 210, option ROMs 230, etc.). In one embodiment, system event log 410 is saved to hardware registers (not illustrated) within processing blade 115A.

Returning to FIG. 3A, once the status information has been accumulated, an error module 415 transmits the status information to management module 110 via communication plane 120. In one embodiment, error module 415 may be the same entity as error module 405, but persisting into the OS runtime. Alternatively, error module 415 may be distinct OS agent loaded and executed during the OS runtime of processing blade 115A. The status information communicated to management module 110 by error module 415 may be the status information accumulated by error module 405 (e.g., system event log 410) or may include subsequent status information accumulated during the OS runtime by error module 415.

In various other embodiments, the status information transmitted to management module 110 may only include information about failed or degraded hardware/software or the status information may include both the fully operation capabilities information and the actual capabilities information transmitted at the same time. The status information may be transmitted during the pre-boot phase by error module 405 or during the OS runtime by error module 415 (as illustrated). Alternatively, in process block 308, management module 110 may query system event log 410 (or other cache of status information maintained on processing blade 115A) to extract the status information from processing blade 115A.

In one embodiment, early in the initialization of processing blade 115A (process block 306), error module 405 may set a watchdog timer 420. Subsequently, in process block 308 and after the initialization has successfully completed, error module 415 executing during the OS runtime clears watchdog timer 420 prior to expiration. However, if watchdog timer 420 expires prior to error module 415 clearing watchdog timer 420, then processing blade 115A may automatically reset and/or alert management module 110.

Figure 5:
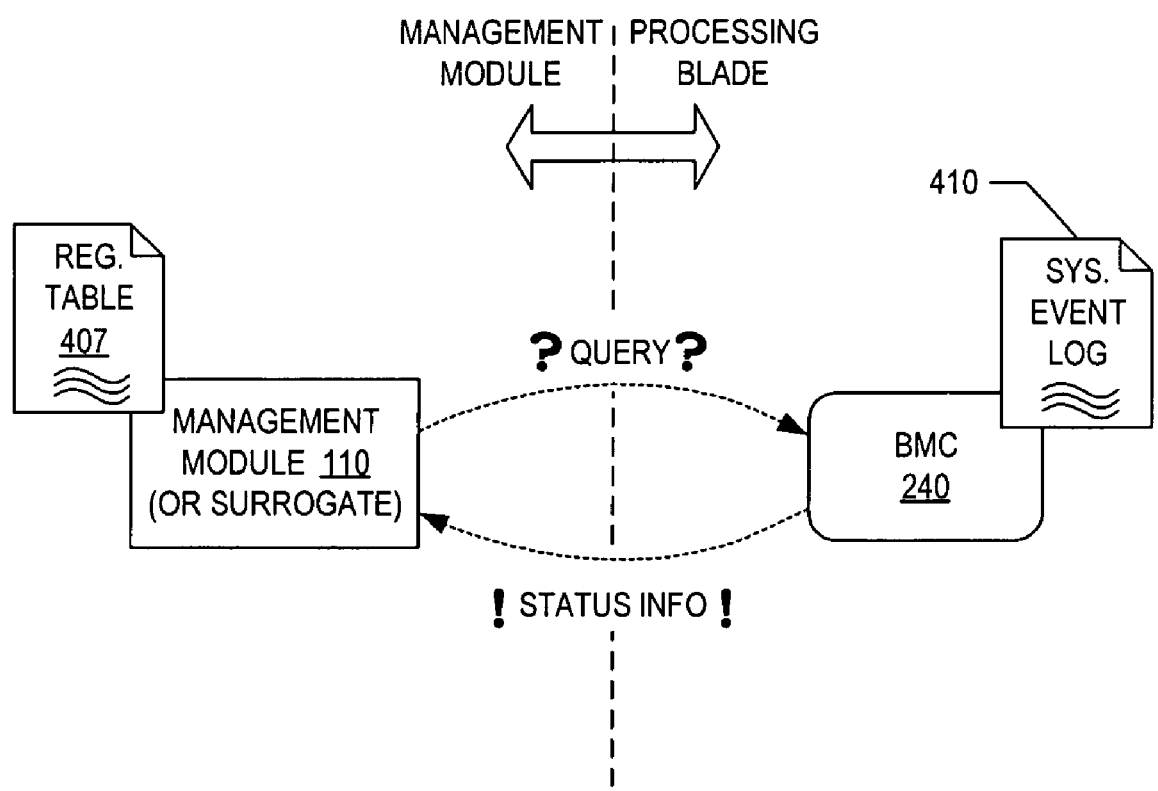
FIG. 5 is a block diagram illustrating a system for communicating status information from a processing blade to a management module, in accordance with an embodiment of the invention.

FIG. 5 is a block diagram illustrating a system 500 for communicating the status information from processing blade 115A to management module 110, in accordance with an embodiment of the invention. FIG. 5 illustrates a hardware embodiment wherein BMC 240 implements the functionality of error modules 405 and 415, as described above. Referring to FIG. 2, sensor lines 250 and 255 couple BMC 240 to system memory 210 and processors 205. BMC 240 may accumulate at least a portion of the status information via these sensor lines. BMC 240 may further generate and maintain system event log 410. In one embodiment, BMC 205 provides the status information to management module 110 (or a surrogate management module) in response to a status query.

Returning to FIG. 3A, in a decision block 310, management module 110 determines whether all processing blades 115 have booted and entered the OS runtime. This determination is based at least in part on the status information transmitted by each of processing blades 115 or the lack thereof indicating a failed initialization. If one of processing blades 115 fails to boot, then process 300 continues to a process block 312. In process block 312, management module 110 increments a failure count for the failed processing blade 115 indicating that the failed processing blade 115 has failed to boot once. If the failure count for the failed processing blade 115 is greater than a predetermined threshold value N (decision block 314), then management module 110 alerts administrator system 135 about the failing processing blade 115 (process block 316) and disables the failing processing blade 115 (process block 318). Returning to decision block 314, if the failure count for the failed processing blade 110 is less than or equal to the threshold value N, then the failed processing blade 110 is reset (process block 320) and allowed to recommence initialization in process block 306 in an attempt to cure the problem.

Returning to decision block 310, if all processing blades 115 have successfully booted into the OS runtime, then process 300 continues to a decision block 322. In decision block 322, management module 110 determines whether any of processing blades 115 have booted into a degraded state. A degraded state may include partially corrupted system memory 210 (e.g., down rev memory), failure of one or more processors 205, a corrupted option ROM 230, or the like. In one embodiment, management module 110 determines whether any of processing blades 115 have booted into a degraded state based on the status information transmitted/queried in process block 308.

If one of processing blades 115 has successfully booted, but into a degraded state, then process 300 continues to a process block 324. In process block 324, management module increments a degraded state ("DS") count for the degraded state processing blade 115. If the DS count for the particular processing blade 115 exceeds a threshold value M (decision block 326), then management module 110 alerts administrator system 135 in process block 316. Since a degraded state processing blade 115 is still capable of servicing work requests received at compute center 100, process block 318 indicates disabling "failed" processing blades 115, but not degraded state processing blades 115. Returning to decision block 326, if the DS count is less than or equal to the threshold value M, then management module 110 resets the degraded state processing blade 115 (process block 320) and allows the degraded state processing blade 115 to recommence initialization in an attempt to cure the problem.

Returning to decision block 322, if all processing blades 115 have successfully booted into fully operational states, then process 300 continues to a decision block 328. In decision block 328, it is determined whether any of processing blades 115 has claimed first chair status. If not, then first chair status is claimed in a process block 330. In one embodiment, any of processing blades 115 is capable of claiming first chair status and thereby assuming a surrogate management module role. In one embodiment, only a few or even just one of processing blades 115 are capable of claiming first chair status.

In one embodiment, first chair status is claimed on a first-come-first-serve basis, whereby the first processing blade 115 to successfully boot into a fully operational state will claim first chair status. First chair status may be claimed using a variety of techniques. For example, first chair status may be claimed by assertion of a "sticky" or persistent line shared by all processing blades 115, assertion of a global variable, querying management module 110 to determine whether first chair status has been claimed by another processing blade 115, and if not, asserting a local persistent variable within each of processing blades 115 and notifying management module 110 to that effect, or other techniques.

Once first chair status has been claimed (e.g., by first chair blade 140), then first chair blade 140 queries management module 110 to determine the operational health of management module 110 (process block 332). If management module 110 responds with a positive healthful response (decision block 334), then process 300 returns to decision block 310 and continues therefrom as described above. Once first chair status is claimed, first chair blade 140 may continue to query management module 110 to assume a surrogate management role in the event management module 110 ceases to operate.

Figure 3B:
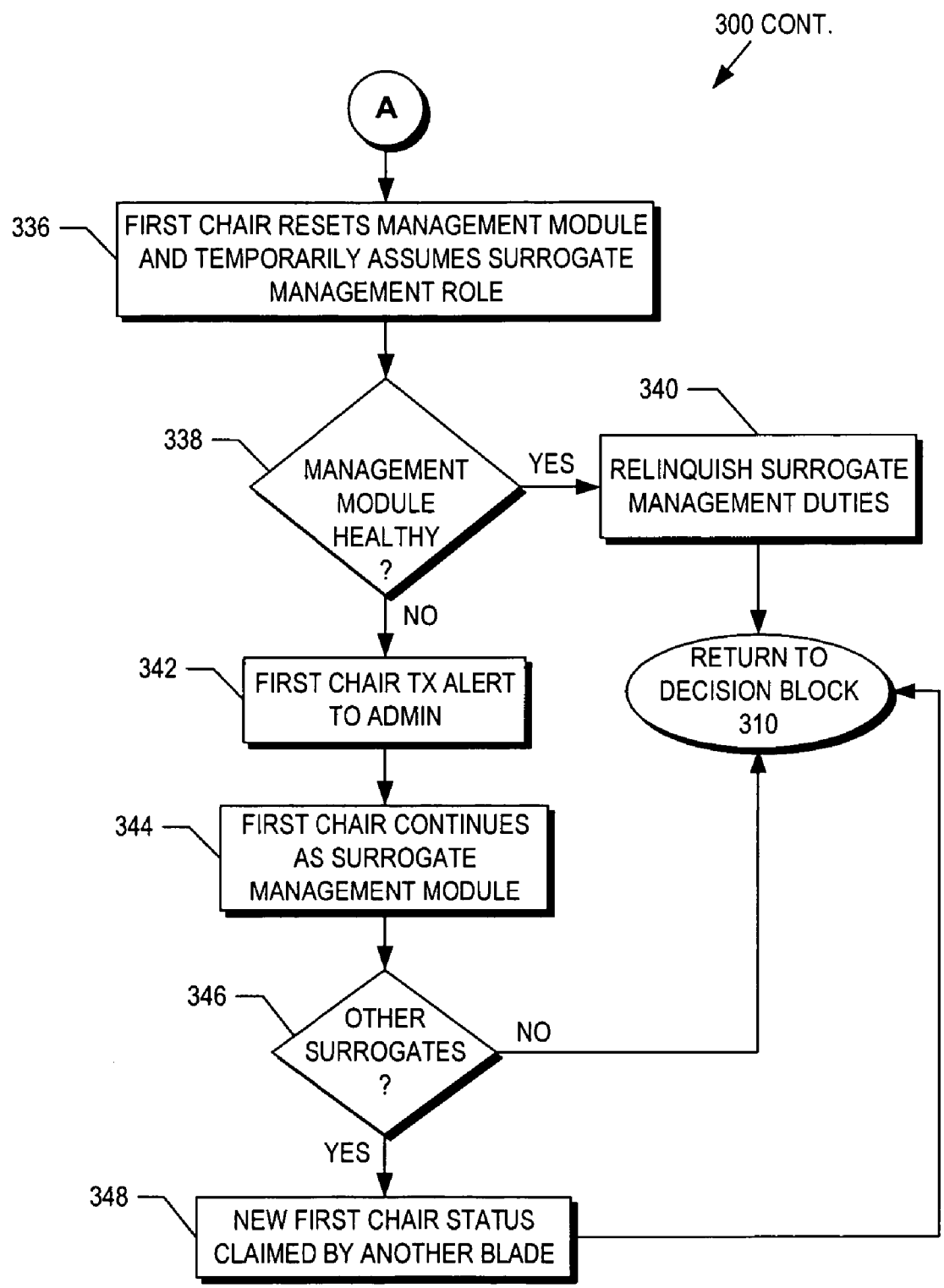
FIG. 3B is a flow chart illustrating a process for resetting a faulty management module and asserting surrogate management module status by a processing blade while the management module is disabled, in accordance with an embodiment of the invention.

If management module 110 fails to respond with a positive healthy response (decision block 334), then process 300 continues to a process block 336 in FIG. 3B, as illustrated by off page reference "A". In process block 336, first chair blade 140 resets management module 110 in an attempt to cure the problem. Upon resetting management module 110, first chair blade 140 may assume surrogate management duties while management module 110 reboots. Upon completion of reboot, if management module 110 is once again healthy (decision block 338), then first chair blade 140 relinquishes surrogate management duties back to management module 110 (process block 340) and process 300 returns to decision block 310. However, if resetting management module 110 does not solve the problem and management module 110 fails to come up in a healthy state, then first chair blade 140 alerts administrator system 135 of the situation (process block 342) and continues to act as the surrogate management module (process block 344).

In a decision block 346, if more than one processing blade 115 is capable of assuming surrogate management duties, then a new first chair blade is assigned/claimed in a process block 348. The first chair status may be assigned to or claimed by the one of processing blades 115 having the next earliest boot timestamp.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
   initializing a plurality of processing systems;
   communicating status information about the operational health of each of the processing systems capable of operation to a management module responsible for managing the processing systems;
   reinitializing one or more of the processing systems, if the management module determines that the one or more of the processing systems is operating in a degraded state based on the status information communicated to the management module from each of the processing systems capable of operation;
   reseting one or more of the processing systems, if the management module determines that the one or more of the processing systems is incapable of operation;
   maintaining a failure count of a number of the resets for each of the processing systems incapable of operation; and
   alerting an administrator system about any of the processing systems having a failure count greater than a predefined number.

2. The method of claim 1, wherein the processing systems comprise processing blades.

3. The method of claim 2, wherein the status information includes at least one of memory status information, processor status information, and option ROM status information.

4. The method of claim 2, further comprising claiming first chair status by one of the processing blades to be a first chair blade, the first chair blade to assume surrogate management module duties if the management module is incapacitated.

5. The method of claim 4, wherein the first chair status is claimed by the one of the processing blades based on an initialization time stamp.

6. The method of claim 4, further comprising:
querying the management module by the first chair blade to determine an operating state of the management module; and
resetting the management module, if the operating state is determined to be a non-healthful state.

7. The method of claim 6, further comprising:
assuming the surrogate management module duties by the first chair blade, while the management module is incapacitated; and
alerting an administrator system of the non-healthful state of the management module.

8. The method of claim 1, further comprising generating system event logs within each of the processing systems to track progress of each the initializations, the status information including entries from the system event logs.

9. A processing blade, comprising
at least one processor to execute instructions;
system memory coupled to the at least one processor;
a communication link to communicatively couple to a management module for managing a rack of processing blades including the processing blade;
an error module configured to generate status information about the operational health of the processing blade and to communicate the status information to the management module via the communication link; and
a surrogate management module, the surrogate management module configured to query the management module for managing the rack of processing blades and to assume tasks for managing the rack of processing blades from the management module if the management module is disabled.

10. The processing blade of claim 9, wherein the status information includes at least one of a first status indication about the system memory and a second status indication about the at least one processor.

11. The processing blade of claim 10, wherein the error module is further configured to interrogate the at least one processor and the system memory during a pre-boot phase of the processing blade to generate the status information.

12. The processing blade of claim 9, wherein the surrogate management module and the error module comprise software entities executed by the at least one processor.

13. The processing blade of claim 11, wherein the error module comprises a service processor and a service processor firmware unit coupled to the service processor.

14. The processing blade of claim 13, further comprising first sensor lines coupled between the at least one processor and the service processor to obtain the status indication about the at least one processor and second sensor lines coupled between the system memory and the service processor to obtain the status indication about the system memory.

15. The processing blade of claim 9, wherein the communication link is configured to couple to a communication plane for interconnecting the rack of processing blades to the management module.

16. A system, comprising:
a chassis;
a management module supported by the chassis;
a communication plane coupled to the management module; and
a plurality of processing blades supported by the chassis and coupled to the communication plane, one of the processing blades including:
at least one processor to execute instructions;
system memory coupled to the at least one processor; and
a surrogate management module, the surrogate management module coupled to query the management module to determine an operational health of the management module and to assume management duties of the management module if the management module is disabled, the management module coupled to the communication plane to manage the plurality of processing blades.

17. The system of claim 16, wherein the one of the processing blades further includes an error module, the error module to generate status information about the operational health of the one of the processing blades and to communicate the status information to the management module.

18. The system of claim 17, wherein the error module comprises service processor and firmware unit.

19. The system of claim 17, wherein the error module comprises a software agent stored within a non-volatile memory device coupled to the at least one processor and executable by the at least one processor.

20. The system of claim 16, wherein the management module includes:
a fail counter to maintain a failure count for each of the processing blades that fails to initialize; and
a degraded state counter to maintain a degraded state count for each of the processing blades that fails to initialize into a fully operational state.

* * * * *